US012651496B2

(12) United States Patent
Fujino

(10) Patent No.: US 12,651,496 B2
(45) Date of Patent: Jun. 9, 2026

(54) VEHICLE INFORMATION RECORDING SYSTEM AND VEHICLE INFORMATION RECORDING APPARATUS

(71) Applicant: JVCKENWOOD Corporation, Yokohama (JP)

(72) Inventor: Minoru Fujino, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 78 days.

(21) Appl. No.: 18/766,485

(22) Filed: Jul. 8, 2024

(65) Prior Publication Data

US 2024/0362959 A1 Oct. 31, 2024

Related U.S. Application Data

(63) Continuation of application No. PCT/JP2022/038837, filed on Oct. 19, 2022.

(30) Foreign Application Priority Data

Mar. 15, 2022 (JP) ................................ 2022-040313

(51) Int. Cl.
*G07C 5/08* (2006.01)

(52) U.S. Cl.
CPC ........... *G07C 5/085* (2013.01); *G07C 5/0808* (2013.01)

(58) Field of Classification Search
None
See application file for complete search history.

(56) References Cited

U.S. PATENT DOCUMENTS

2010/0023207 A1 1/2010 Maeda et al.
2014/0015661 A1* 1/2014 Fujime .............. G01M 17/0076 701/33.4
2017/0053460 A1 2/2017 Hauser et al.

FOREIGN PATENT DOCUMENTS

JP H07-172251 A 7/1995
JP 2002193070 A * 7/2002
JP 2008-254507 A 10/2008
JP 2020091589 A 6/2020
WO 2005-057519 A1 6/2005

* cited by examiner

*Primary Examiner* — Abdhesh K Jha
(74) *Attorney, Agent, or Firm* — PROCOPIO, CORY, HARGREAVES & SAVITCH LLP

(57) ABSTRACT

A vehicle information recording system according to the present disclosure includes a situation information acquisition unit, a drive control unit, a position information acquisition unit, a failure determination unit, and a storage unit. The situation information acquisition unit acquires situation information about inside and outside a vehicle. The drive control unit outputs an operation log of the vehicle. The position information acquisition unit acquires position information of the vehicle. The failure determination unit determines whether there is occurrence of a failure in the vehicle or not. The storage unit stores, in association with one another, in a case where occurrence of a failure in the vehicle is determined by the failure determination unit, details of the failure, the situation information, the operation log, and the position information.

2 Claims, 6 Drawing Sheets

| ROAD INFORMATION | WEATHER INFORMATION | EASILY FAILING PART | PROCESS |
|---|---|---|---|
| DOWNWARD SLOPE | FAIR | ENGINE, BRAKE | INCREASE IMAGE QUALITY OF INSIDE IMAGE OF VEHICLE |
| DOWNWARD SLOPE | HOT | ENGINE, BRAKE | INCREASE IMAGE QUALITY OF INSIDE IMAGE OF VEHICLE |
| DOWNWARD SLOPE | RAIN | BRAKE, TIRE | INCREASE IMAGE QUALITY OF OUTSIDE IMAGE OF VEHICLE |
| DOWNWARD SLOPE | SNOW | BRAKE, TIRE | INCREASE IMAGE QUALITY OF OUTSIDE IMAGE OF VEHICLE |
| TRAFFIC CONGESTION | FAIR | ENGINE, BRAKE, AIR CONDITIONER | INCREASE IMAGE QUALITY OF INSIDE IMAGE OF VEHICLE |
| TRAFFIC CONGESTION | HOT | ENGINE, BRAKE, AIR CONDITIONER | INCREASE IMAGE QUALITY OF INSIDE IMAGE OF VEHICLE |
| TRAFFIC CONGESTION | RAIN | ENGINE, BRAKE, WIPER | INCREASE IMAGE QUALITY OF INSIDE IMAGE OF VEHICLE |
| TRAFFIC CONGESTION | SNOW | ENGINE, BRAKE, WIPER | INCREASE IMAGE QUALITY OF INSIDE IMAGE OF VEHICLE |
| ⋮ | ⋮ | ⋮ | ⋮ |

Fig. 4

VEHICLE INFORMATION RECORDING SYSTEM AND VEHICLE INFORMATION RECORDING APPARATUS

CROSS REFERENCE TO RELATED APPLICATION

This application is based upon and claims the benefit of priority from Japanese patent application No. 2022-040313, filed on Mar. 15, 2022, the disclosure of which is incorporated herein in its entirety by reference.

BACKGROUND

The present disclosure relates to a vehicle information recording system and a vehicle information recording apparatus.

Japanese Unexamined Patent Application Publication No. H07-172251 describes a failure diagnosis apparatus that records a drive state associated with a time point of occurrence of a failure in a vehicle. The failure diagnosis apparatus described in Japanese Unexamined Patent Application Publication No. H07-172251 includes information detection means for detecting information related to a drive state of a vehicle, and a storage unit for chronologically storing the information.

SUMMARY

The failure diagnosis apparatus described in Japanese Unexamined Patent Application Publication No. H07-172251 is an apparatus that monitors an operation state of a vehicle and that records a drive state at a time of an abnormality or a failure in the vehicle that is caused during traveling, and is a so-called dashboard camera, and coordination thereof with other devices is difficult. Accordingly, the failure diagnosis apparatus described in Japanese Unexamined Patent Application Publication No. H07-172251 can only store information about the state of a vehicle, and cannot sufficiently acquire information that is necessary to identify a cause of a failure.

That is, the failure diagnosis apparatus described in Japanese Unexamined Patent Application Publication No. H07-172251 has a problem in that information that is necessary to identify a cause of a failure in a vehicle cannot be sufficiently acquired, and that a cause of a failure in a vehicle cannot be easily identified.

A vehicle information recording system according to the present embodiment is a vehicle information recording system including:

a situation information acquisition unit configured to acquire situation information about inside and outside a vehicle;

a drive control unit configured to output an operation log of the vehicle;

a position information acquisition unit configured to acquire position information of the vehicle;

a failure determination unit configured to determine whether there is occurrence of a failure in the vehicle or not; and a storage unit configured to store, in association with one another, in a case where occurrence of a failure in the vehicle is determined by the failure determination unit, details of the failure, the situation information, the operation log, and the position information.

A vehicle information recording apparatus according to the present embodiment is a vehicle information recording apparatus including:

a situation information acquisition unit configured to acquire situation information about inside and outside a vehicle;

an operation log acquisition unit configured to acquire an operation log of the vehicle;

a position information acquisition unit configured to acquire position information of the vehicle;

a failure information acquisition unit configured to acquire information about whether there is occurrence of a failure in the vehicle or not; and a storage unit configured to store, in association with one another, in a case where there is occurrence of a failure in the vehicle, details of the failure, the situation information, the operation log, and the position information.

BRIEF DESCRIPTION OF THE DRAWINGS

The above and other aspects, advantages and features will be more apparent from the following description of certain embodiments taken in conjunction with the accompanying drawings, in which:

FIG. 4 is a diagram showing a table that is referred to by a failure part prediction unit 6;

DETAILED DESCRIPTION

First Embodiment

<Configuration of Vehicle Information Recording System>

Hereinafter, an embodiment of the present disclosure will be described with reference to the drawings. First, a configuration of a vehicle information recording system according to the present embodiment will be described in detail.

Figure 1:
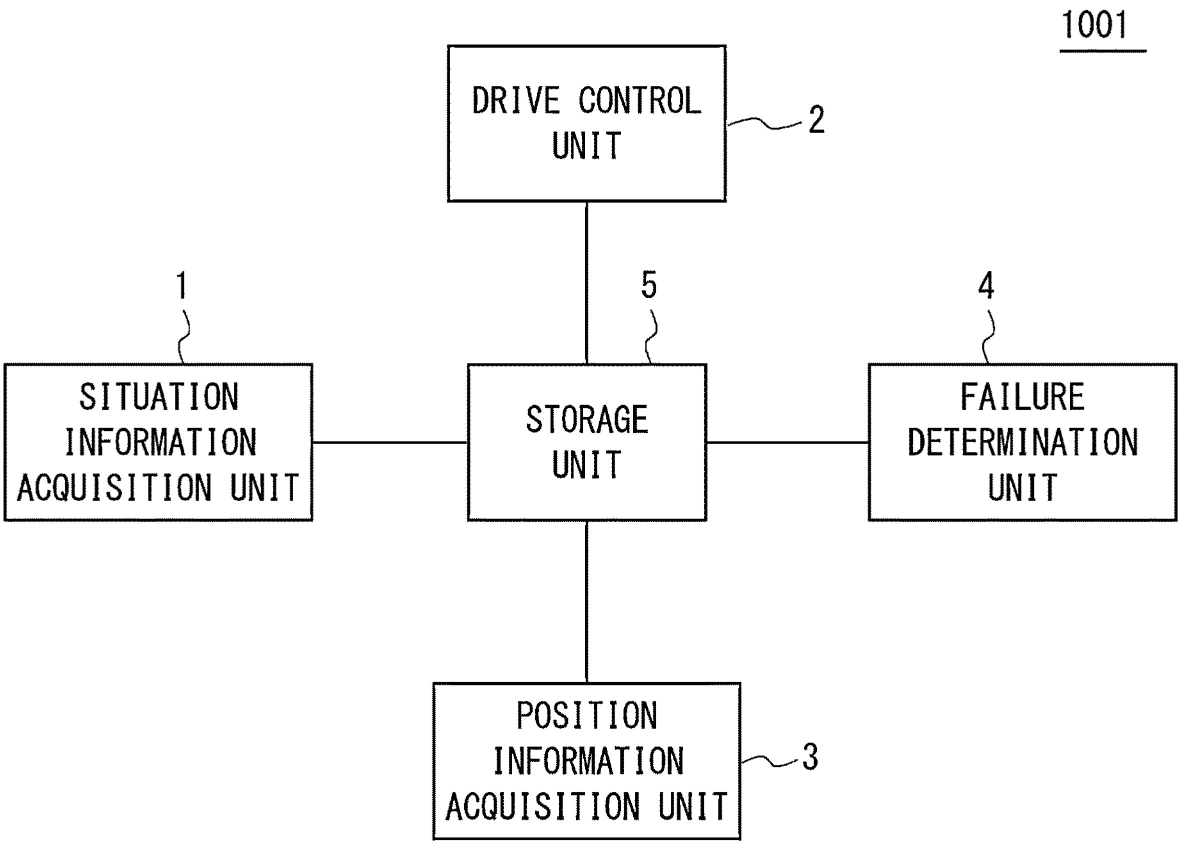
FIG. 1 is a block diagram showing a configuration of a vehicle information recording system according to a first embodiment.

FIG. 1 is a block diagram showing a configuration of a vehicle information recording system according to the first embodiment. A vehicle information recording system 1001 is a system provided in a vehicle, and is a system for storing information that is used to identify a cause of a failure in a case where there is occurrence of a failure in the vehicle.

For example, the vehicle information recording system 1001 is a system that acquires various pieces of information for identifying a cause of a failure through a coordinated operation among a plurality of apparatuses such as a dashboard camera, a navigation apparatus, an ECU (Engine Control Unit) of the vehicle, a failure diagnosis device and the like, and that stores the pieces of information in association with one another.

The vehicle information recording system 1001 includes a situation information acquisition unit 1, a drive control unit

2, a position information acquisition unit 3, a failure determination unit 4, and a storage unit 5.

The situation information acquisition unit 1 acquires situation information about inside and outside the vehicle. The situation information acquisition unit 1 outputs the acquired situation information to the storage unit 5.

The situation information about inside and outside the vehicle may include one or both of situation information about inside the vehicle and situation information about outside the vehicle.

Here, the situation information that is acquired by the situation information acquisition unit 1 is information recording an external factor that is a possible cause of a failure, a phenomenon caused by a failure, a phenomenon that is a precursor to a failure, a scene of occurrence of a failure, or the like. For example, video data, sound data, or a measurement value from a meter or a gauge is detected as the situation information.

For example, the situation information may include image data capturing a state of a road where the vehicle is traveling, a traffic state, or the like. Moreover, image data capturing a driver driving the vehicle, or image data capturing various meters provided at a driver's seat may also be included.

In this case, the situation information acquisition unit 1 may be configured as an image capturing unit of a dashboard camera that is attached to the vehicle, for example.

Furthermore, the situation information may include image data recording a specific part inside the vehicle, or recorded sound data, for example. Various parameter values such as an amount of output of the part, temperature, and the like may also be included.

In this case, the situation information acquisition unit 1 may be configured as an image capturing apparatus for capturing a specific part inside the vehicle, a sound recording apparatus for recording sound emitted from the part, or a sensor for detecting the various parameter values, for example.

The situation information acquisition unit 1 may be configured as, but not limited to, a single apparatus or may be formed from a plurality of apparatuses, for example.

In the case where the situation information acquisition unit 1 is formed from a plurality of apparatuses, an amount of information for identifying a cause of a failure that can be acquired is increased, and a cause of a failure can be more swiftly identified.

For example, the drive control unit 2 is a functional block of an ECU of a vehicle, and controls operation of the vehicle based on a drive operation by a driver.

The drive control unit 2 outputs, as an operation log, details of a drive operation by a driver and/or details of control of behavior of the vehicle performed based on the drive operation. The drive control unit 2 outputs the operation log to the storage unit 5.

The position information acquisition unit 3 acquires position information of the vehicle. The position information acquisition unit 3 outputs the acquired position information of the vehicle to the storage unit 5.

For example, the position information acquisition unit 3 is configured as a navigation apparatus provided in the vehicle. For example, the position information acquisition unit 3 may acquire a current position of the vehicle as the position information by using GNSS (Global Navigation Satellite System) or the like.

The position information acquisition unit 3 may also refer to information at the current position of the vehicle and map information, and may acquire road information at a position where the vehicle is traveling as the position information. In other words, the position information to be acquired by the position information acquisition unit 3 may include road information at a position where the vehicle is traveling.

The road information here may include information about a maintenance state of a road surface, or a state of a road, such as slope of the road surface or whether the road surface is frozen or not, for example. Furthermore, information about a shape of the road, such as an intersection, a straight road, a curved road, or a tunnel, may be included. Moreover, information about a traffic state of a road, such as whether there is a traffic congestion or not, may also be included.

Furthermore, the position information acquisition unit 3 may refer to information at the current position of the vehicle, access a predetermined weather database (not shown) connected to the Internet or a weather information site to obtain weather information at a position where the vehicle is traveling, and acquire the weather information as the position information. In other words, the position information to be acquired by the position information acquisition unit 3 may include weather information at a position where the vehicle is traveling.

For example, the weather information here may include information about weather, such as fair weather, hot weather, rain, and snow, or may include information about a temperature, a degree of humidity or the like.

The failure determination unit 4 determines whether there is occurrence of a failure in the vehicle. In the case of determining that there is occurrence of a failure, the failure determination unit 4 notifies the storage unit 5 of occurrence of the failure and details of the failure that occurred.

For example, the failure determination unit 4 may determine whether there is occurrence of a failure in the vehicle, based on information detected by a sensor attached to the vehicle or a numerical value indicated by a meter.

For example, the failure determination unit 4 may be configured as an apparatus that is attached to the vehicle, or in other words, a failure diagnosis device, or may be configured as a functional block of the ECU.

In the case where occurrence of a failure in the vehicle is determined by the failure determination unit 4, the storage unit 5 stores details of the failure, the situation information, the operation log, and the position information in association with one another. More specifically, when notified by the failure determination unit 4 of occurrence of a failure and details of the failure that occurred, the storage unit 5 stores, in association with one another, the details of the failure, the situation information acquired from the situation information acquisition unit 1, the operation log acquired from the drive control unit 2, and the position information acquired from the position information acquisition unit 3.

For example, the storage unit 5 may be a storage unit provided in the dashboard camera, a storage unit provided in the ECU, or a storage unit provided in a failure diagnosis device. Furthermore, an external storage apparatus that is connected to the vehicle may also be adopted. Moreover, a storage unit of an external server (not shown) that is capable of communicating with the vehicle may also be adopted.

That is, the storage unit 5 may adopt any configuration as long as details of a failure in the vehicle, the situation information, the operation log, and the position information can be stored in association with one another.

For example, the storage unit 5 may store the situation information, the operation log, and the position information related to a timing of occurrence of a failure, or may store the situation information, the operation log, and the position information related to a predetermined time period before and after occurrence of the failure. It is also possible to store only one of a predetermined time period before occurrence of a failure, and a predetermined time period after occurrence of the failure. Additionally, each piece of information mentioned above may be stored in association with time information.

When notified of occurrence of a failure by the failure determination unit 4, the storage unit 5 may acquire and store the situation information, the operation log, and the position information that are associated with a time period corresponding to the failure respectively from the situation information acquisition unit 1, the drive control unit 2, and the position information acquisition unit 3.

In this case, the situation information acquisition unit 1, the drive control unit 2, and the position information acquisition unit 3 may each store acquired information for a predetermined time period, and delete the acquired information at a timing of a lapse of the predetermined time period.

Furthermore, the storage unit 5 may acquire the situation information, the operation log, and the position information from the situation information acquisition unit 1, the drive control unit 2, and the position information acquisition unit 3, respectively, and store the pieces of information for a predetermined time period, and delete information for which there is a lapse of the predetermined time period from acquisition. Then, when notified of occurrence of a failure from the failure determination unit 4, the storage unit 5 may store the situation information, the operation log, and the position information related to a time period corresponding to the failure without deleting the pieces of information.

In this case, the situation information acquisition unit 1, the drive control unit 2, and the position information acquisition unit 3 may keep outputting the acquired information to the storage unit 5.

<Operation of Vehicle Information Recording System>

Figure 2:
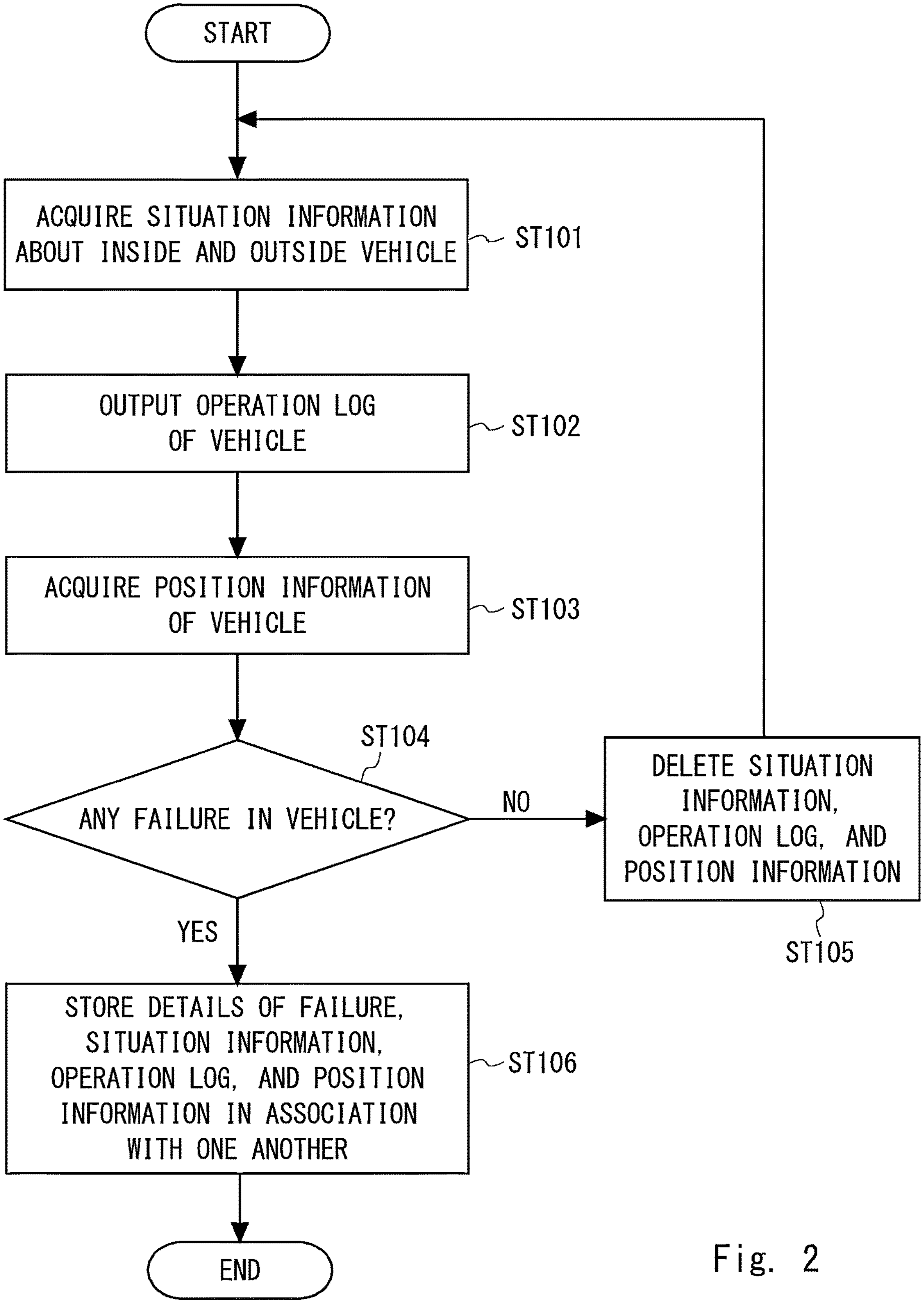
FIG. 2 is a flowchart showing an operation of the vehicle information recording system according to the first embodiment.

Next, operation of the vehicle information recording system according to the present embodiment, or in other words, a vehicle information recording method will be described in detail with reference to the drawings. FIG. 2 is a flowchart showing an operation of the vehicle information recording system according to the first embodiment.

Additionally, reference will be made to FIG. 1 as appropriate in the following description.

First, the situation information acquisition unit acquires the situation information about inside and outside the vehicle (step ST101). Next, the drive control unit 2 outputs the operation log of the vehicle (step ST102). Next, the position information acquisition unit 3 acquires the position information of the vehicle (step ST103).

Additionally, an order of steps ST101 to ST103 does not have to be the stated order. Furthermore, steps ST101 to ST103 may be performed in parallel.

Next, the failure determination unit 4 determines whether there is occurrence of a failure in the vehicle or not (step ST104).

In the case where there is no occurrence of a failure in the vehicle (step ST104: NO), the vehicle information recording system 1001 deletes the situation information, the operation log, and the position information (step ST105). Then, operations in step ST101 to step ST104 are performed again. That is, the vehicle information recording system 1001 repeatedly performs operations in steps ST101 to ST105 until a failure in the vehicle is detected.

Additionally, step ST105 may be performed by the situation information acquisition unit 1, the drive control unit 2, and the position information acquisition unit 3, or may be performed by the storage unit 5.

In the case where there is occurrence of a failure in the vehicle (step ST104: YES), the storage unit 5 stores, in association with one another, details of the failure, the situation information, the operation log, and the position information (step ST106), and ends the series of operations.

As described above, the vehicle information recording system according to the present embodiment stores, in association with one another, the situation information, the operation log, and the position information of a vehicle that are associated with the time of occurrence of a failure. As a result, the vehicle information recording system according to the present embodiment is capable of sufficiently acquiring information for identifying a cause of a failure in a vehicle, and a cause of a failure can be more easily identified.

Second Embodiment

<Configuration of Vehicle Information Recording System>

Next, a vehicle information recording system according to a second embodiment will be described with reference to the drawings. The vehicle information recording system according to the second embodiment is an application example of the vehicle information recording system according to the first embodiment.

Figure 3:
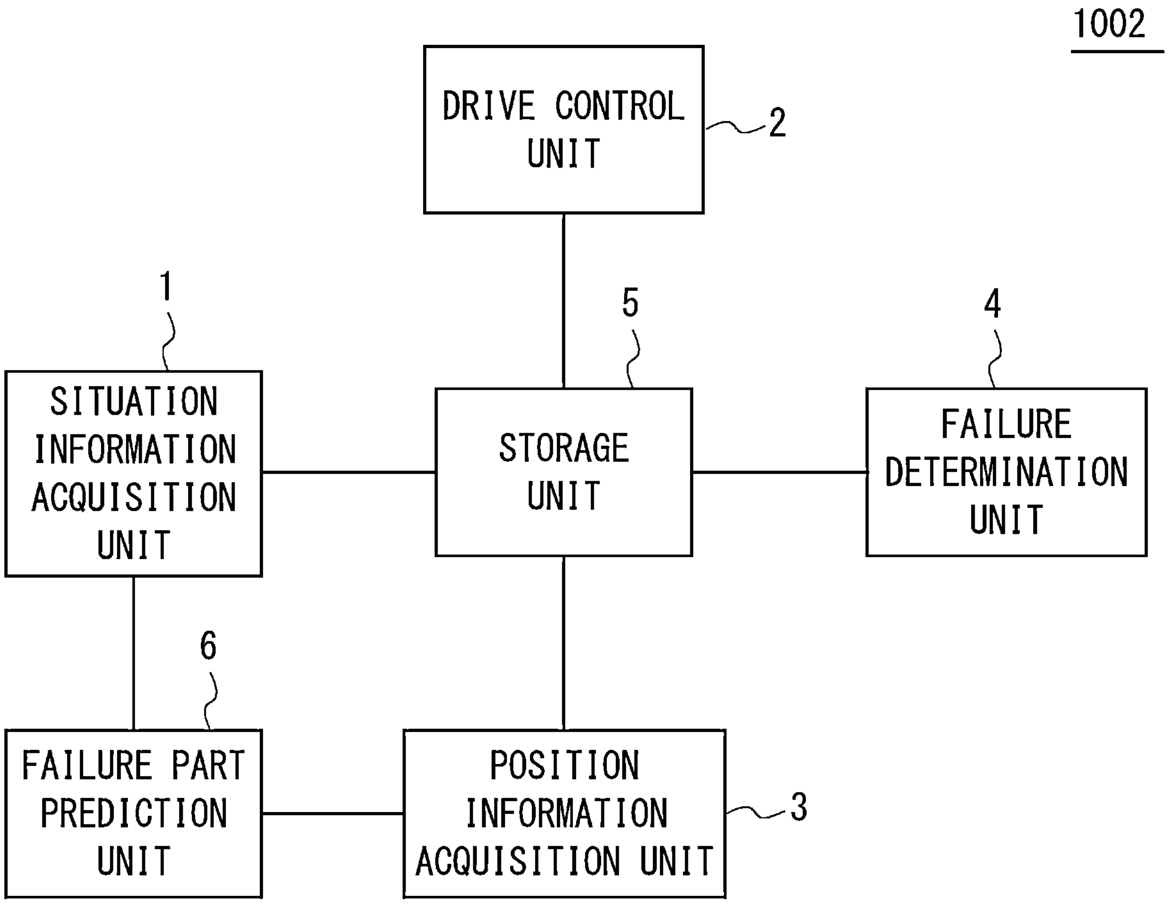
FIG. 3 is a block diagram showing a configuration of a vehicle information recording system according to a second embodiment.

FIG. 3 is a block diagram for describing a configuration of the vehicle information recording system according to the second embodiment. A vehicle information recording system 1002 is different from the vehicle information recording system 1001 according to the first embodiment in that a failure part prediction unit 6 is included.

Preferred aspects of the drive control unit 2, the failure determination unit 4, and the storage unit 5 are the same as those in the first embodiment.

The position information acquisition unit 3 outputs the position information not only to the storage unit 5 but also to the failure part prediction unit 6. Additionally, in the present embodiment, a description is given below assuming that the position information acquired by the position information acquisition unit 3 includes the road information and the weather information.

The failure part prediction unit 6 receives, from the position information acquisition unit 3, the position information including the road information and the weather information. The failure part prediction unit 6 predicts a part in the vehicle where a failure may easily occur, based on the position information. The failure part prediction unit 6 outputs information about the predicted part to the situation information acquisition unit 1.

Information about the predicted part here may include identification information of the part and/or instruction information about a process that the situation information acquisition unit 1 needs to perform in relation to the part, for example.

Additionally, the instruction information here may be information for instructing the situation information acquisition unit 1 to perform a process of increasing accuracy of acquisition of situation information about a periphery of the part where a failure may easily occur.

For example, the failure part prediction unit 6 may hold a table recording, in association with one another, the position information and a part where a failure may easily occur, and may refer to the table and predict a part where a failure may easily occur.

FIG. 4 is a diagram showing the table that is referred to by the failure part prediction unit 6. Columns in the table shown in FIG. 4 show the road information, the weather information, a part where a failure may easily occur, and a process that needs to be performed by the situation information acquisition unit 1.

Referring to the table shown in FIG. 4, “engine” and “brake” are indicated in the column for a part where a failure may easily occur, in relation to a row where the road information is “downward slope” and the weather information is “fair weather”, for example. This means that, in the case where the vehicle is traveling on a downward slope and the weather is fair, a failure may easily occur in “engine, brake”. Moreover, “increase image quality of inside image of vehicle” is described in the column for process. This means that the situation information acquisition unit needs to perform a process of capturing an inside image of the vehicle while increasing image quality.

In the case where the failure part prediction unit 6 is to refer to the table shown in FIG. 4 and predict a part where a failure may easily occur, the failure part prediction unit 6 determines the row to be referred to, based on the road information and the weather information recorded in the position information acquired from the position information acquisition unit 3. Moreover, a part described in the column for a part where a failure may easily occur, in the determined row, is predicted to be a part where a failure may easily occur.

Furthermore, in the case where the failure part prediction unit 6 is to output, to the situation information acquisition unit 1, the instruction information about a process that needs to be performed, the failure part prediction unit 6 outputs, as the instruction information, contents in the column for process in the determined row.

However, means used by the failure part prediction unit 6 to predict a part where a failure may easily occur is not limited to the means described above, and any means may be used as long as a part where a failure may easily occur can be predicted by such means. For example, the failure part prediction unit 6 may predict a part where a failure may easily occur, by using artificial intelligence (AI) that learnt of a relationship between the position information and a part where a failure may easily occur. In the description given above, a part where a failure may easily occur is predicted based on the position information including the road information and the weather information, but a part where a failure may easily occur may also be predicted based on the position information including only the road information and not the weather information, or based on the position information including only the weather information and not the road information. For example, a brake may be predicted to be a part where a failure may easily occur, in the case of traveling on a downward slope where a curve continues, or setting may be performed such that an engine is predicted to be a part where a failure may easily occur, in the case of traveling in a scorching (hot weather) environment, because there is a possibility of overheating of the engine.

In the case where a part where a failure may easily occur is predicted by the failure part prediction unit 6, the situation information acquisition unit 1 increases accuracy of acquisition of the situation information about a periphery of the part. More specifically, identification information of the predicted part or the instruction information described above is acquired from the failure part prediction unit 6, and the accuracy of acquisition of the situation information about a periphery of the part is increased.

The accuracy of acquisition of the situation information refers to image quality of image data, or a sound collection gain of sound data, for example. In the case where accuracy of acquisition of the situation information is increased, more accurate and precise information can be acquired, but a strain may be put on memory resources because of an increase in an amount of information. With the vehicle information recording system 1002 according to the present embodiment, a part where a failure may easily occur is predicted by the failure part prediction unit 6 and the accuracy of acquisition of the situation information about a periphery of the part is increased, and thus, an increase in the amount of information is suppressed, and also, more accurate and precise situation information can be acquired.

<Operation of Vehicle Information Recording System>

Next, an operation of the vehicle information recording system according to the second embodiment will be described with reference to a drawing.

Figure 5:
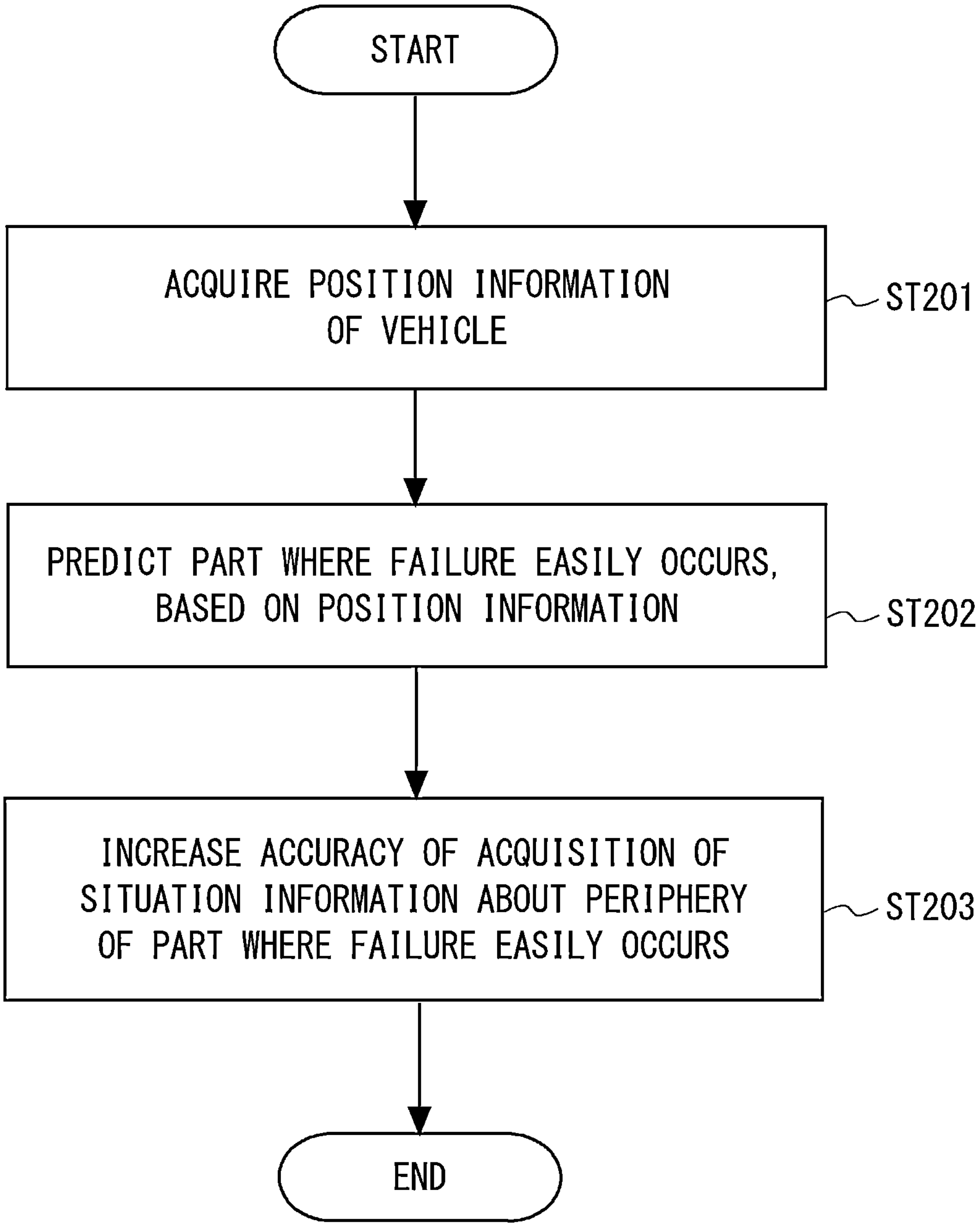
FIG. 5 is a flowchart showing an operation of the vehicle information recording system according to the second embodiment.

FIG. 5 is a flowchart showing an operation of the vehicle information recording system according to the second embodiment. The vehicle information recording system 1002 performs the series of operations described with reference to FIG. 2 in the first embodiment, and also performs a series of operations shown in FIG. 5.

In the operation shown in FIG. 5, first, the position information acquisition unit 3 acquires the position information of the vehicle (step ST201). However, the operation in step ST201 may be replaced by step ST103 shown in FIG. 2.

Next, the failure part prediction unit 6 predicts a part where a failure may easily occur, based on the position information (step ST202).

Lastly, the situation information acquisition unit 1 increases the accuracy of acquisition of the situation information about a periphery of the part where a failure may easily occur (step ST203), and the series of operations is ended.

As described above, the vehicle information recording system 1002 according to the present embodiment predicts a part where a failure may easily occur, and increases accuracy of acquisition of the situation information about a periphery of the part. According to such a configuration, the vehicle information recording system 1002 according to the present embodiment may suppress an increase in the amount of information, and may acquire more accurate and precise situation information.

Third Embodiment

<Configuration of Vehicle Information Recording System>

In the following, a third embodiment according to the present invention will be described in detail with reference to a drawing. A vehicle information recording system according to the third embodiment is a specific example of the vehicle information recording system according to the first embodiment.

Figure 6:
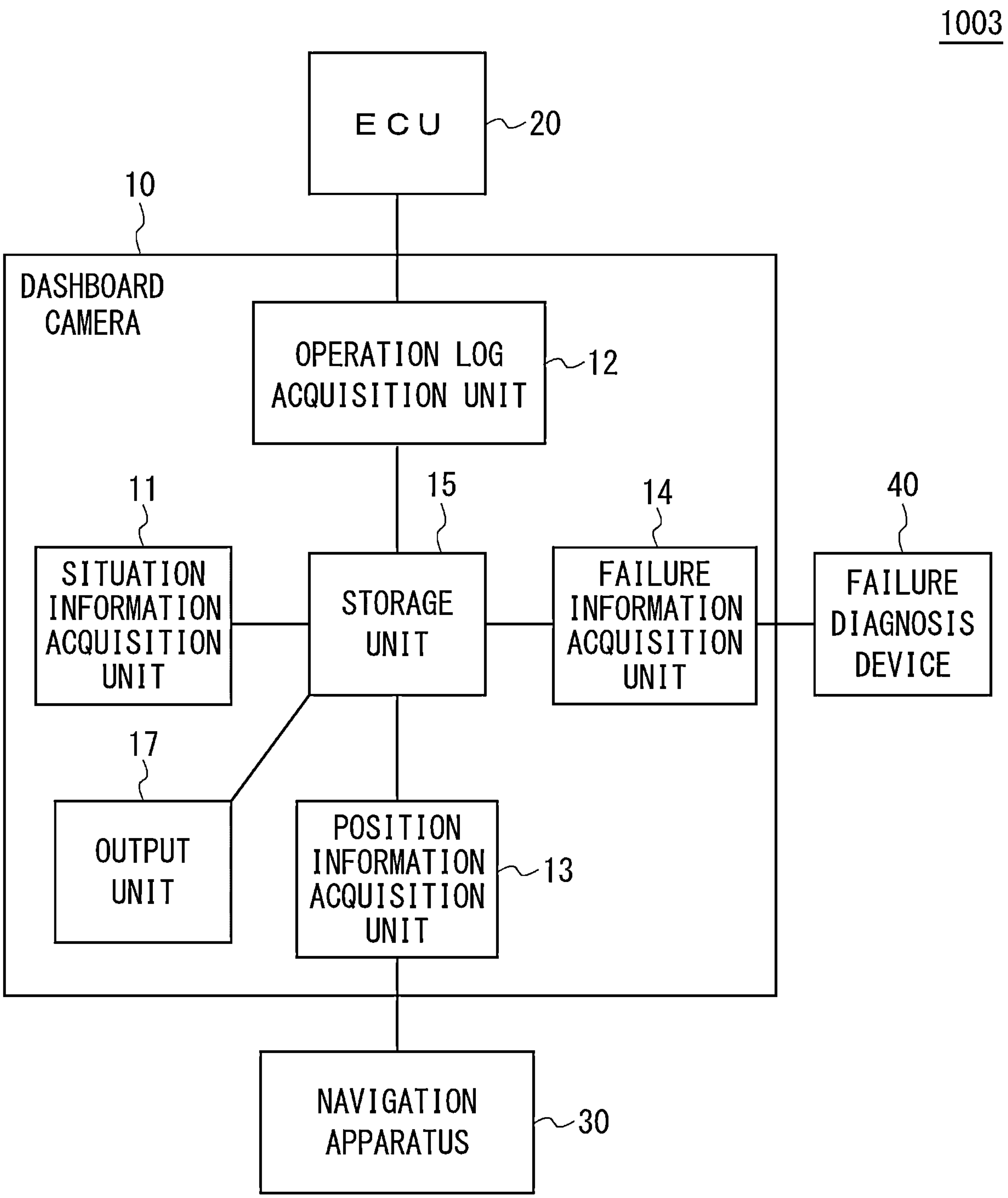
FIG. 6 is a block diagram showing a configuration of a vehicle information recording system according to a third embodiment.

FIG. 6 is a block diagram showing a configuration of the vehicle information recording system according to the third embodiment. A vehicle information recording system 1003 may be implemented through a coordinated operation among a dashboard camera, an ECU, a navigation apparatus, and a failure diagnosis device.

The vehicle information recording system 1003 records, in the dashboard camera, information output from each device, with a failure in the vehicle, occurrence of a trouble, or the like as a trigger. That is, with the vehicle information recording system 1003, the dashboard camera functions as the vehicle information recording apparatus.

The vehicle information recording system 1003 includes a dashboard camera 10, an ECU 20, a navigation apparatus 30, and a failure diagnosis device 40.

The ECU 20 is a control apparatus for controlling operation of the vehicle. The ECU 20 controls traveling of the vehicle based on operation by a driver. The ECU 20 outputs an operation log of the driver, and outputs the same to the dashboard camera 10.

The navigation apparatus 30 is a guide apparatus provided in the vehicle, and acquires position information of the vehicle. The navigation apparatus 30 outputs the acquired position information of the vehicle to the dashboard camera 10.

The failure diagnosis device 40 is an apparatus provided in the vehicle, and determines whether there is occurrence of a failure in the vehicle or not, and outputs a determination result to the dashboard camera 10. Furthermore, in the case where there is occurrence of a failure in the vehicle, the failure diagnosis device 40 also outputs details of the failure to the dashboard camera 10.

The dashboard camera 10 according to the present embodiment is typically configured as an image capturing apparatus that is attached near a driver's seat in the vehicle.

The dashboard camera 10 according to the present embodiment includes a situation information acquisition unit 11, an operation log acquisition unit 12, a position information acquisition unit 13, a failure information acquisition unit 14, a storage unit 15, and an output unit 17.

The situation information acquisition unit 11 is an image capturing unit of the dashboard camera, and acquires image data. The situation information acquisition unit 11 outputs the acquired image data to the storage unit 15. The image data here corresponds to the situation information according to the first and second embodiments.

The operation log acquisition unit 12 acquires the operation log of the driver from the ECU 20. The operation log acquisition unit 12 outputs the acquired operation log to the storage unit 15.

The position information acquisition unit 13 acquires the position information of the vehicle from the navigation apparatus 30. The position information acquisition unit 13 outputs the acquired position information to the storage unit 15.

The failure information acquisition unit 14 acquires, from the failure diagnosis device 40, information about whether there is occurrence of a failure in the vehicle or not. Furthermore, in the case where there is occurrence of a failure in the vehicle, the failure information acquisition unit 14 also acquires details of the failure from the failure diagnosis device 40. The failure information acquisition unit 14 outputs, to the storage unit 15, information about whether there is occurrence of a failure in the vehicle or not and details of the failure.

The storage unit 15 is a storage unit of the dashboard camera 10, and acquires the image data captured by the situation information acquisition unit 11. Furthermore, the operation log is acquired from the operation log acquisition unit 12, and the position information of the vehicle is acquired from the position information acquisition unit 13. Moreover, information about whether there is occurrence of a failure in the vehicle or not is acquired from the failure information acquisition unit 14, and in the case where there is occurrence of a failure in the vehicle, details of the failure are also acquired.

In the case where there is occurrence of a failure, the storage unit 15 stores, in association with one another, details of the failure, the situation information, the operation log, and the position information.

The output unit 17 outputs the details of the failure, the situation information, the operation log, and the position information that are stored in the storage unit 15 in association with one another. For example, the output unit 17 may be a transmitter that transmits the pieces of information. Moreover, the output unit 17 may write the pieces of information in a non-transitory storage medium such as a USB (Universal Serial Bus) memory, for example.

According to the configuration as described above, the vehicle information recording system 1003 is able to store, in association with one another, details of a failure, the situation information of the vehicle at the time of occurrence of the failure, the operation log, and the position information.

Other Embodiments

With the vehicle information recording system according to the third embodiment, the dashboard camera, the ECU, the navigation apparatus, and the failure diagnosis device are operated in a coordinated manner with one another, and pieces of information output from respective apparatuses are stored in the storage unit of the dashboard camera in association with one another. However, the pieces of information may instead be stored in a storage unit of the ECU, or in a storage unit of the failure diagnosis device, or in a storage unit of the navigation apparatus. That is, in the third embodiment, the dashboard camera functions as the vehicle information recording apparatus, but the ECU, the failure diagnosis device, or the navigation apparatus may instead function as the vehicle information recording apparatus. Furthermore, an external storage apparatus different from the apparatuses mentioned above may be further operated in a coordinated manner, and the external storage apparatus may function as the vehicle information recording apparatus.

Such an apparatus configuration may also allow the vehicle information recording system 1003 to store, in association with one another, details of a failure, the situation information of the vehicle at the time of occurrence of the failure, the operation log, and the position information. Furthermore, a configuration is also possible where the failure part prediction unit 6 described in the second embodiment is added to the dashboard camera 10 of the vehicle information recording system 1003 according to the third embodiment.

Heretofore, the present invention has been described with reference to the embodiments, but the present invention is not limited to the configurations of the embodiments described above, and various modifications, alterations, and combinations that can be devised by those skilled in the art within the scope of the invention described in the claims of the present application are of course included.

The present disclosure can provide a vehicle information recording system and a vehicle information recording apparatus that are capable of facilitating identification of a cause of a failure in a vehicle.

The first to third and other embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A vehicle information recording system comprising:

a camera configured to acquire situation information about inside and outside a vehicle;

an engine control unit (ECU) configured to output an operation log of the vehicle;

a global navigation satellite system (GNSS) configured to acquire position information of the vehicle which includes at least one of road information and weather information related to a position where the vehicle is traveling;

wherein the ECU is further configured to determine whether there is occurrence of a failure in the vehicle, wherein the ECU is further configured to predict a part that is subject to the occurrence of the failure in the vehicle, based on the road information and the weather information related to the position where the vehicle is traveling, and wherein, in a case where the part that is subject to the occurrence of the failure is predicted by the ECU, the camera increases accuracy of acquisition of the situation information about a periphery of the part; and a memory configured to store, in association with one another, in a case where occurrence of a failure in the vehicle is determined by the ECU, details of the failure, the situation information, the operation log, and the position information of the vehicle.

2. A vehicle information recording apparatus comprising:

a camera configured to acquire situation information about inside and outside a vehicle;

an engine control unit (ECU) configured to acquire an operation log of the vehicle;

a global navigation satellite system (GNSS) configured to acquire position information of the vehicle which includes at least one of road information and weather information related to a position where the vehicle is traveling;

wherein the ECU is further configured to acquire information about whether there is occurrence of a failure in the vehicle wherein the ECU is further configured to predict a part that is subject to the occurrence of the failure in the vehicle, based on the road information and the weather information related to the position where the vehicle is traveling, and wherein, in a case where the part that is subject to the occurrence of the failure is predicted by the ECU, the camera increases accuracy of acquisition of the situation information about a periphery of the part; and a memory configured to store, in association with one another, in a case where there is occurrence of a failure in the vehicle, details of the failure, the situation information, the operation log, and the position information of the vehicle.

* * * * *